Nov. 12, 1940.                    H. J. SEAMAN                    2,221,221
                                ROTARY SOIL TILLER
                              Filed Aug. 25, 1939                2 Sheets-Sheet 1
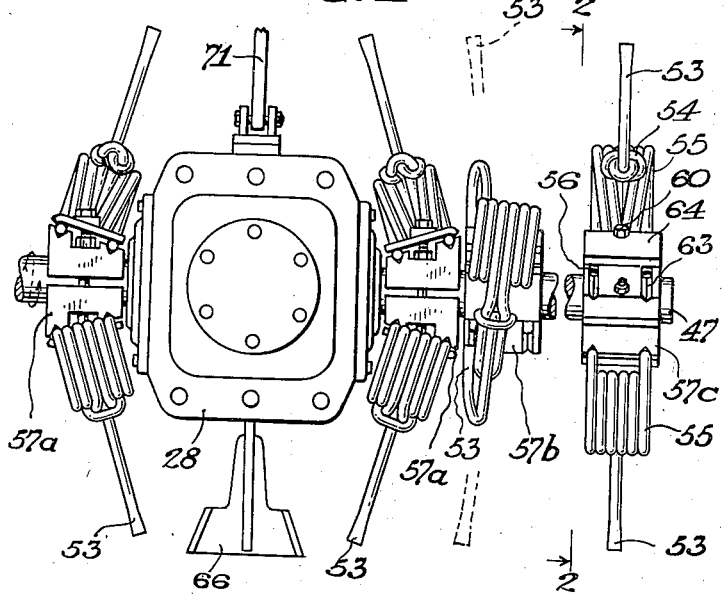
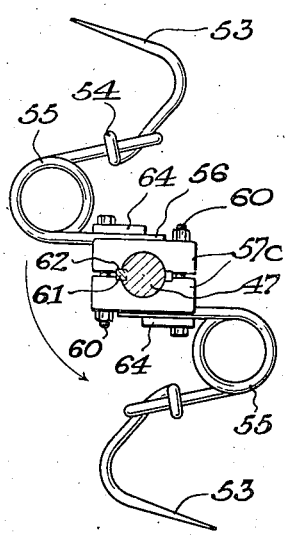
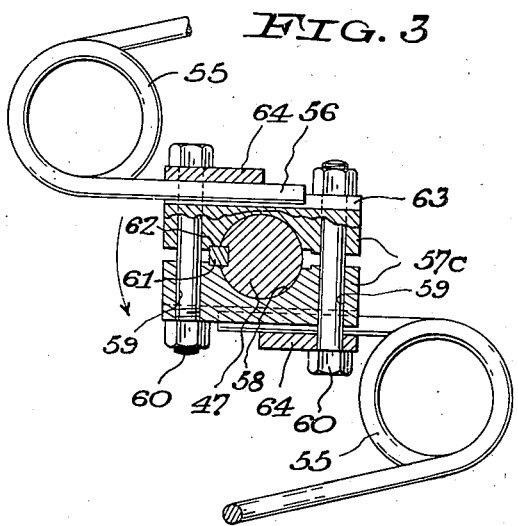
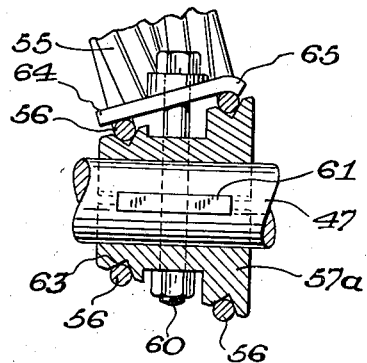
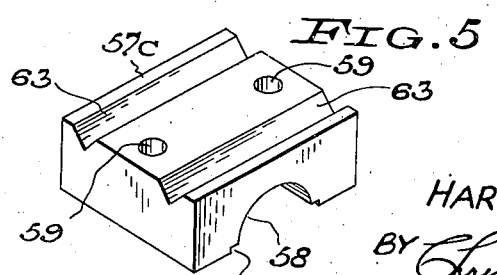
INVENTOR
HARRY J. SEAMAN
BY Christopher L. Waal
ATTORNEY Nov. 12, 1940.  H. J. SEAMAN  2,221,221
ROTARY SOIL TILLER
Filed Aug. 25, 1939  2 Sheets-Sheet 2
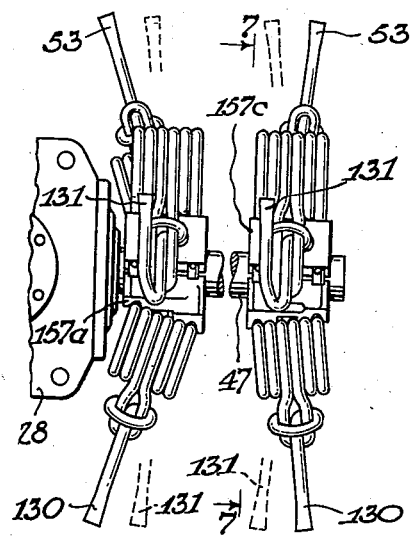
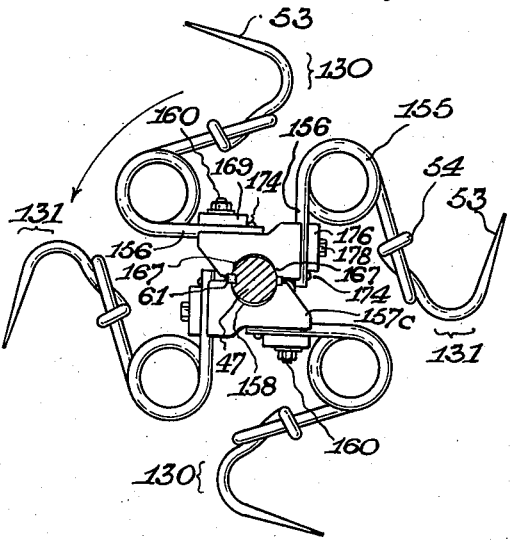
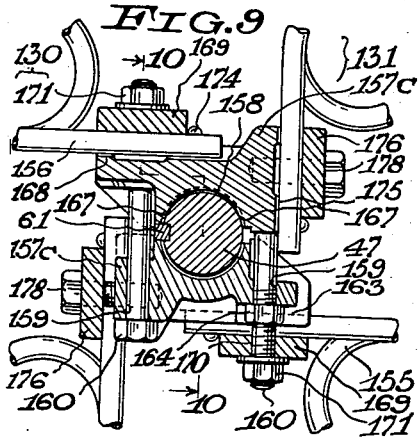
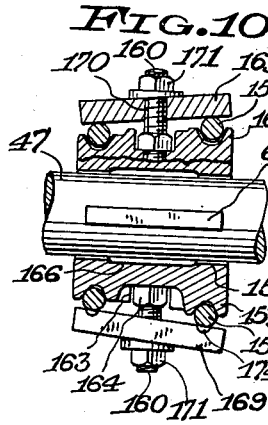
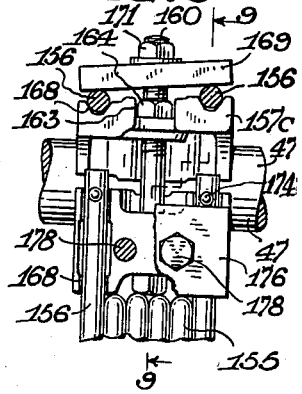
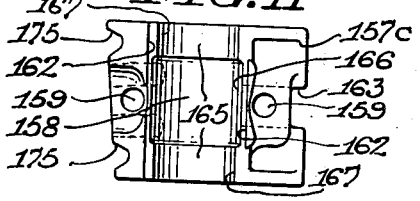
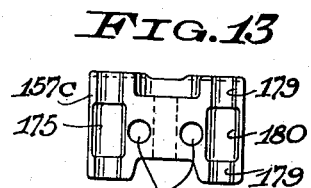
INVENTOR
HARRY J. SEAMAN
BY Christopher L. Wade
ATTORNEY Patented Nov. 12, 1940

2,221,221

UNITED STATES PATENT OFFICE 2,221,221

ROTARY SOIL TILLER

Harry J. Seaman, Milwaukee, Wis.

Application August 25, 1939, Serial No. 291,837

13 Claims. (Cl. 97—216)

This invention relates to rotary soil tillers and the like and more particularly to the rotary tools thereof and their mountings.

An object of the invention is to provide simple, durable and inexpensive means for firmly mounting soil-working tools on a rotary shaft.

Another object of the invention is to provide a tool mounting which is easily and quickly assembled, and which will facilitate attachment and replacement of the tools.

The invention further consists in the several features hereinafter described and claimed.

This application constitutes a continuation in part of my copending application Serial No. 189,058, filed February 7, 1938.

In the accompanying drawings, illustrating certain embodiments of the invention, Fig. 1 is a rear elevation of a soil tiller provided with tool mountings constructed in accordance with the invention;

Fig. 2 is a side elevation of one of the tool mountings, a driving shaft thereof being shown in transverse section along the line 2—2 of Fig. 1;

Fig. 3 is a detail sectional elevation of the tool mounting, taken transversely of the shaft;

Fig. 4 is a detail sectional elevation of another of the tool mountings, taken longitudinally of the shaft;

Fig. 5 is a perspective view of a holder or carrier of one of the tool mountings;

Fig. 6 is a rear elevation of a soil tiller provided with tool mountings of a modified form;

Fig. 7 is a side elevation of one of the tool mountings of Fig. 6, the driving shaft thereof being shown in transverse section along the line 7—7 of Fig. 6;

Fig. 8 is a detail elevation of the tool mounting of Fig. 7, parts being broken away and parts being shown in section;

Fig. 9 is a detail sectional elevation of the tool mounting of Figs. 7 and 8, taken generally along the line 9—9 of Fig. 8;

Fig. 10 is a detail sectional elevation of the tool mounting, taken generally along the line 10—10 of Fig. 9;

Fig. 11 is a view of the inner face of one of the mounting members or holders of the tool mounting;

Fig. 12 is a view of the outer face of the mounting member;

Fig. 13 is a detail elevation of the mounting member, showing a tool-receiving portion thereof;

Fig. 14 is a detail view of a tool-clamping plate, and

Fig. 15 is a detail view similar to Fig. 7 but with the tools removed.

In these drawings, 28 designates a gear housing of a soil tiller, the housing being supported by suitable means including a suspension bar 71.

A driving or tiller shaft 47 is rotatably mounted in the housing 28 and projects from opposite sides thereof, the shaft extending transversely of the direction of travel of the machine. The shaft carries thereon a plurality of tilling or soil-working units or devices mounted in accordance with the invention.

In that form of the invention shown in Figs. 1 to 5, each tilling unit comprises a pair of soil-working or cultivating tools here shown in the form of diametrically opposite hooked tines or teeth 53 which have looped inner ends 54 firmly but detachably mounted in a well-known manner on the looped outer portions of respective coiled springs 55. Each spring 55 has a pair of parallel inner ends or shanks 56 secured to an associated mounting member or holder carried on the shaft. In the present instance, the mounting members are of three types, designated 57a, 57b, and 57c, and are arranged in diametrically opposite pairs. Each mounting member has a semi-cylindrical opening or channel 58, Fig. 5, forming a seat to fit on the shaft, and has a pair of parallel bores 59 at opposite sides extending transversely of the channel to receive clamping bolts 60 by which a pair of opposed mounting members are rigidly clamped to the shaft. Each pair of mounting members are held against relative rotation on the shaft by a key 61 which is seated in the shaft and which fits in grooves or rabbets 62 formed in the mounting members along the edges of the semi-cylindrical channels 58.

The outer face of each mounting member is provided with a pair of transversely extending parallel V-grooves 63 to form seats to receive the spring ends or shanks 56 which are held therein by an apertured clamping plate 64 secured in place by one of the bolts 60. Each bolt passes through the opposed clamping members and through one of the clamping plates. If desired, a side edge of the plate 64 may be hooked as indicated at 65 in Fig. 4. The mounting members 57a, which are nearest the gear housing 28, have their grooves 63 at different distances from the axis of the shaft, the groove farther from the housing being also farther from this axis, as indicated in Figs. 1 and 4, to cause the tines 53 to project toward and overhang the gear housing, whereby to till the soil under the housing. In some instances, a subsoiler and spreader 66 may be carried centrally under the housing. The pairs of mounting members 57b, which are next to the members 57a, are similar thereto, but place the tines at a smaller angle to a plane normal to the shaft, as indicated by dotted lines in Fig. 1. One or more pairs of the mounting members 57c are carried on the shaft beyond the mounting member 57b, the tines mounted on the members 57c being substantially at right-angles to the shaft.

The several tilling units at each side of the gear housing are angularly spaced and distributed on the tiller shaft, any two adjacent units preferably having a wide angular spacing. The tilling units are positioned by the keys 61 which are angularly spaced on the shaft. The springs of the several tilling units may all be identical and the tines 53 may also be identical. However, the tines are readily replaceable by others of various shapes to meet different soil conditions.

In securing each pair of the mounting members on the shaft, the bolt 60 on the key side of the shaft is first tightened to clamp the key between the mounting members, and the other bolt is then tightened to clamp these members to the shaft. The clamping bolts also form means for securing in place the clamping plates 64 for the springs 55. By loosening the bolts the springs 55 may be replaced when desired.

In the form of the invention shown in Figs. 6 to 14, each tilling unit or device comprises two pairs of soil-working or cultivating tools 130 and 131, the four tools being spaced at equal angular intervals about the shaft. The tools 130 and 131 may be of identical construction and each is here shown in the form of a hooked tine or tooth 53 which has a looped end 54 firmly but detachably mounted in a well known manner on the looped intermediate portion of a coiled spring 155 similar to the springs 55 of the device of Fig. 1. Each spring 155 has spaced parallel inner ends or shanks 156 secured to a mounting member carried on the shaft. In the present instance, the mounting members are of a plurality of types, designated 157a and 157c, and are arranged in diametrically opposite pairs. Each mounting member, which is preferably a metal casting, has a channel 158 of generally semi-cylindrical shape to form a seat for the shaft, and has a pair of parallel bores 159 at opposite sides extending transversely of the channel to receive clamping bolts 160 by which a pair of the mounting members are clamped to the shaft in opposed relation. Each pair of mounting members are held against relative rotation on the shaft by a key 61 which is seated in the shaft and which fits in grooves or rabbets 162 formed in the mounting members along the edges of the semi-cylindrical channels 158. Each mounting member has a parallel-sided recess 163 in its outer face to receive and confine against relative rotation a nut 164 for the associated bolt 160, the screw-threaded end of the bolt projecting beyond the nut.

The semi-cylindrical channel 158 of each mounting member has lands 165 at opposite ends which bear on the shaft, the channel being relieved at 166 between the lands, Figs. 10 and 11, and this relieved portion being spaced from the shaft. Each land has bearing portions 167 adjacent to the opposite sides of the channel to engage the shaft and is spaced from the shaft between these bearing portions, Figs. 9 and 15. This construction avoids overstressing or cracking of the mounting members when the bolts are tightened and also avoids longitudinal rocking of the mounting members on the shaft. The construction further eliminates the need for machining the channels.

The outer face of each mounting member is provided with a pair of transversely extending V-grooves 168 to form seats for the spring ends or shanks 156 of the tools 130 which are held therein by a clamping plate 169, the plate having a central opening 170 to receive therethrough the screw-threaded end of one of the bolts 160, and the bolt carrying a clamping nut 171 for the plate. Each V-groove 168 has spaced lands 172, Fig. 12, at opposite sides of a relieved space 173. The lands are at opposite sides of a plane parallel to the axis of the shaft and containing the axis of the associated bolt 160, the lands being about equally spaced from this plane. This relation serves to insure firm clamping of the spring shanks 156 and to minimize bending stresses on the bolt. Furthermore, no machining of the V-grooves is required. Preferably, each spring shank has formed thereon, as by welding, a retaining nub or projection 174 to engage the inner edge of the clamping plate 169.

One end face of each mounting member is provided with a pair of transversely extending V-grooves 175 which lie approximately in the same radial planes as the V-grooves 168 and which form seats for the parallel shanks 156 of the tools 131. The spring shanks are held in the V-grooves 175 by a clamping plate 176 having a pair of openings 177, Fig. 14, to receive therethrough bolts or cap screws 178 which are screw-threaded into tapped holes 178' in the mounting member at opposite sides of the transversely extending bolt hole 159. Each V-groove 175 has spaced lands 179, Fig. 13, at opposite sides of a relieved space 180. The lands 179 are spaced about equally at opposite sides of a plane parallel to the axis of the shaft and containing the axes of the cap screws 178, this plane passing centrally through the clamping plate. This relation insures firm clamping of the spring ends and minimizes bending stresses on the cap screws. No machining of the V-grooves 175 is required.

The mounting members 157a, which are nearest to the gear housing 28, have their V-grooves 168 at different distances from the axis of the shaft, the groove farther from the housing being farther from this axis, as indicated in Fig. 6, to cause the tines 53 of the tools 130 to project toward and overhang the housing, whereby to till the soil under the housing. The V-grooves 175 of the mounting members 157a are similarly arranged at different distances from the shaft axis to tilt the tools 130 toward the housing, but at a smaller angle with respect to a plane normal to the shaft. The paths of travel of the tines 53 of the tools 130 and 131 are thus arranged in axially spaced planes normal to the shaft, as indicated in Fig. 6, this relation being produced without increasing the axial length of the mounting members.

The mounting members 157c also have their V-grooves 168 and 175 at different distances from the shaft axis so as to tilt the tools at a small angle with respect to the shaft. In this case, however, the outer ends of the tines of the tools 130 are at one side of a plane normal to the shaft and passing centrally through the mounting members, and the outer ends of the tines of the tools 131 are at the other side of this plane, as indicated in Fig. 6. The paths of travel of the tines of the tools 130 and 131 are thus arranged in axially spaced planes normal to the shaft, and this relation is produced without increasing the axial length of the mounting members.

In securing each pair of the mounting members 157a and 157c on the shaft, the bolt 160 on the key side of the shaft is first tightened to clamp the key between the mounting members, the nut 164 being held against rotation by the opposite side walls of the recess 163. The other bolt is then tightened to clamp the mounting members to the shaft. The springs 155 of the tools 130 are then seated in the grooves 168 of the mounting members and are clamped thereto by the clamping plates 169 and nuts 171. In a similar manner the springs of the tools 131 are clamped to the mounting members by the clamping plates 170 and cap screws 178. The tines 53 of the tools are then hooked onto the springs. As the mounting members of each tool unit are secured to the shaft independently of the tools, the assembling operation is relatively simple and the tools may be individually replaced without disturbing each other or the clamped mounting members.

In the operation of each form of tool unit, the driving or tiller shaft is driven at a suitable speed in the direction indicated by arrows, causing the hooked, self-sharpening, pick-forming tines to enter, break-up and pulverize the soil. Simultaneously, the machine moves forward at a low rate of speed.

Machines embodying the tool mountings of the invention are usable not only in agriculture but also for various other purposes, such as mixing construction materials for road building.

What I claim as new and desire to secure by Letters Patent is:

1. In a rotary soil tiller, the combination, with a rotatable soil-working shaft having a key, of a pair of opposed members on said shaft engaging said key between them, and means for clamping said key between said members and for clamping said members on said shaft.

2. In a rotary soil tiller, the combination, with a rotatable shaft having a key, of a pair of opposed members on said shaft engaging said key between them, at least one of said members having a groove to receive said key, means for clamping said key between said members and for clamping said members to said shaft, and a soil-working tool carried by one of said members.

3. In a rotary soil tiller, the combination, with a rotatable shaft, of a mounting member on said shaft, means including a bolt for clamping said mounting member on said shaft, a soil-working tool, and means including a movable part on said bolt for securing said tool to said mounting member, said part being releasable independently of the rest of said clamping means to permit detachment of said tool from the clamped mounting member.

4. In a rotary soil tiller, the combination, with a rotatable shaft, of a mounting member on said shaft, means for clamping said mounting member on said shaft, a soil-working tool, and means for detachably clamping said tool to the clamped mounting member, said first and second clamping means having a part common to both, and said second clamping means having a movable part releasable independently of said first clamping means to permit detachment of said tool from the clamped mounting member.

5. In a rotary soil tiller, the combination of a rotatable shaft, a mounting member, means for clamping said mounting member to said shaft, said mounting member having tool seats at its outer side arranged angularly with respect to each other, tools having shanks bearing on said seats, and means for clamping said tool shanks to said seats, said first and second clamping means having a part in common for one of said tools.

6. In a rotary soil tiller, the combination of a rotatable shaft, a tool-mounting member having a channel to receive said shaft, said channel having shaft-engaging surfaces adjacent to its opposite sides and being spaced from said shaft between said surfaces, and means for clamping said member to said shaft.

7. In a rotary soil tiller, the combination of a rotatable shaft, a tool-mounting member secured to said shaft and having tool seats at the outer side thereof extending transversely of the shaft and at an angle to each other of substantially less than 180°, tool elements engaging said seats, and means for clamping said tool elements to said seats.

8. In a rotary soil tiller, the combination of a rotatable shaft, a mounting member on said shaft, means for rigidly securing said mounting member to said shaft including a bolt and a clamping nut on said bolt, said bolt having a screw-threaded end portion projecting beyond said nut, a tool element, and means for securing said tool element to said mounting member including a second nut on said projecting end portion of said bolt, said second nut being releasable without disturbing said first nut.

9. In a rotary soil tiller, the combination of a rotatable shaft, a pair of opposed mounting members secured to said shaft, and a pair of tool elements secured to the outer side of each mounting member and extending at different angles with respect to a plane normal to said shaft to cause the outer ends of said tool elements to travel in axially spaced paths.

10. In a rotary soil tiller, the combination of a rotatable shaft, a pair of opposed mounting members secured to said shaft, and a pair of tool elements secured to the outer side of each mounting member and extending at different angles with respect to a plane normal to said shaft to cause the outer ends of said tool elements to travel in axially spaced paths, the inner end portions of said tool elements being substantially coextensive in an axial direction.

11. In a rotary soil tiller, the combination of a rotatable shaft, a pair of opposed mounting members secured to said shaft and each having tool seats at its outer side extending transversely of the shaft and of each other, the tool seats of said members being arranged about said shaft at intervals of approximately 90°, tool elements adapted to engage said seats, and means for clamping said tool elements to said seats.

12. In a rotary soil tiller, the combination of a rotatable shaft, a mounting member secured to said shaft and having grooves transverse to said shaft, a tool having shanks seated in said grooves, each groove having longitudinally spaced lands to engage the respective tool shank, the groove surfaces between said lands being spaced from said tool shank, and means for clamping said tool shanks in said grooves, the center of clamping pressure on each tool shank being between the lands of the associated groove.

13. In an agricultural machine, the combination of a rotatable shaft, a mounting member secured on said shaft and having transverse seats at different distances from the axis of said shaft, and a soil-working tool having spaced attaching portions engaging said seats and secured thereto to incline said tool with respect to the shaft axis.

HARRY J. SEAMAN.